(12) United States Patent
Hosini et al.

(10) Patent No.: US 8,937,798 B2
(45) Date of Patent: Jan. 20, 2015

(54) METHOD AND CONTROL ARRANGEMENT IN A POWER SYSTEM

(71) Applicants: Falah Hosini, Vasteras (SE); Tomas Jonsson, Vasteras (SE); Tomas Larsson, Vasteras (SE); Mauro Monge, Vasteras (SE); Jean-Philippe Hasler, Vasteras (SE)

(72) Inventors: Falah Hosini, Vasteras (SE); Tomas Jonsson, Vasteras (SE); Tomas Larsson, Vasteras (SE); Mauro Monge, Vasteras (SE); Jean-Philippe Hasler, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/066,052

(22) Filed: Oct. 29, 2013

(65) Prior Publication Data

US 2014/0055116 A1    Feb. 27, 2014

Related U.S. Application Data

(63) Continuation of application No. PCT/EP2011/056810, filed on Apr. 29, 2011.

(51) Int. Cl.
   *H02H 9/06* (2006.01)
   *H02M 5/29* (2006.01)
   *H02J 3/18* (2006.01)
   *H02J 3/24* (2006.01)

(52) U.S. Cl.
   CPC .............. *H02M 5/29* (2013.01); *H02J 3/1807* (2013.01); *H02J 3/24* (2013.01); *Y02E 40/30* (2013.01)
   USPC .......................................... 361/119; 361/117

(58) Field of Classification Search
   USPC .................................................. 361/117–120
   See application file for complete search history.

(56) References Cited

U.S. PATENT DOCUMENTS

| | | | |
|---|---|---|---|
| 2,470,454 A | 5/1949 | Alexanderson | |
| 4,156,264 A * | 5/1979 | Hoover | 361/56 |
| 4,434,376 A | 2/1984 | Hingorani | |
| 5,994,883 A | 11/1999 | Liu | |
| 2013/0114168 A1* | 5/2013 | Andersson | 361/56 |

FOREIGN PATENT DOCUMENTS

WO    2007075131 A1    7/2007

OTHER PUBLICATIONS

International Preliminary Report on Patentability Application No. PT/EP2011/056810 Completed: Feb. 28, 20113; Apr. 23, 2013 12 pages.
International Search Report an Written Opinion of the International Searching Authority Application No. PCT/EP2011/056810 Completed: Nov. 17, 2011; Mailing Date: Nov. 25, 2011 8 pages.

* cited by examiner

*Primary Examiner* — Danny Nguyen
(74) *Attorney, Agent, or Firm* — St. Onge Steward Johnston & Reens LLC

(57) ABSTRACT

A method of controlling a magnitude of an electrical parameter in a power system via a high voltage electron tube. The method includes the steps of measuring the magnitude of the electrical parameter; generating a control signal based on the magnitude of the electrical parameter and on a reference magnitude of the electrical parameter; and switching the high voltage electron tube via the control signal such that the reference magnitude of the electrical parameter is essentially obtained. A control arrangement and a power system is also presented.

13 Claims, 3 Drawing Sheets

METHOD AND CONTROL ARRANGEMENT IN A POWER SYSTEM

FIELD OF THE INVENTION

The present invention generally relates to power systems and in particular to a method of controlling a magnitude of an electrical parameter in a power system, to a control arrangement carrying out the method, and a power system comprising such a control arrangement.

BACKGROUND OF THE INVENTION

A power system, such as a power grid, is in general sensitive to load variations and to faults occurring in the power system. Therefore, various compensating techniques have been developed in order to provide power system stabilization.

Flexible Alternating Current Transmission Systems (FACTS) are known to improve the stability and capacity of power systems by providing power compensation by generating or consuming reactive power in an AC portion of the power system. Compensating equipment includes switchable capacitor banks, reactors and power electronic devices such as voltage source converters and STATCOMs.

Although means for stabilizing a power system exist, there is still a need for improvements in power system stabilization. Moreover, there is a need for reducing costs which arise when providing such stabilization.

SUMMARY OF THE INVENTION

A general object of the present disclosure is to provide a method and a control arrangement for stabilization of a power system.

In a first aspect of the present disclosure, the above object is obtained or at least partly achieved by providing a method of controlling a magnitude of an electrical parameter in a power system by means of a high voltage electron tube, the method comprising: measuring the magnitude of the electrical parameter; generating a control signal based on the magnitude of the electrical parameter and on a reference magnitude of the electrical parameter; and switching the high voltage electron tube by means of the control signal such that the reference magnitude of the electrical parameter is essentially obtained.

By means of providing high voltage electron tubes for the control of an electrical parameter in a power system, fast-responding switching for a relatively low cost may be obtained.

Moreover, losses may be reduced compared to semiconductor switching devices. Semiconductor switching devices in high voltage applications comprise a plurality of semiconductors in series connection, and utilize cooling systems such that the semiconductors can maintain temperatures within their operational temperature range.

Furthermore, since one piece of high voltage electron tube may be sufficient for each electrical phase, a control arrangement comprising such an electron tube may occupy less space than a switch arrangement comprising stacks of semiconductors.

With an electrical parameter is herein meant an electric current, a voltage, an impedance or active power.

The high voltage electron tube may be parallel connected to a capacitor and the step of switching the high voltage electron tube provides a variable capacitive compensation in the power system.

Thereby a variable impedance high-pass filter, e.g. 50-60 Hz power components are allowed through the filter, may be provided, whereby power oscillations in the power system may be dampened and/or sub-synchronous resonance may be reduced.

The high voltage electron tube may be arranged as a start-up device for connecting a load to the power system, wherein the switching of the high voltage electron tube comprises switching the high voltage electron tube such that the magnitude of the electrical parameter increases from being essentially zero to an operational magnitude level of the load.

Thereby any load or generator to be connected to the grid may be gradually introduced in the power system in the sense that the current and voltage to the load or generator may be provided from/to the power system in a controlled manner.

One embodiment may comprise detecting a surge by determining a deviation in the magnitude of the electrical parameter from a predetermined range, wherein the step of switching involves switching the high voltage electron tube such that the surge is essentially removed from the power system.

In a second aspect of the present disclosure there is provided a computer program product comprising a computer program stored on a computer readable medium, which computer program when executed performs the method according to the first aspect.

In a third aspect of the present disclosure there is provided a control arrangement for controlling a magnitude of an electrical parameter in a power system, which control arrangement comprises: a high voltage electron tube having first connection means and second connection means for connection to the power system; a control unit arranged to be connected to the high voltage electron tube, and a measuring unit arranged to measure the magnitude of the electrical parameter in the power system, and to provide a measure of the magnitude of the electrical parameter to the control unit, wherein the control unit is arranged to generate a control signal based on the magnitude of the electrical parameter, and on a reference magnitude of the electrical parameter, and to switch the high voltage electron tube by means of the control signal such that the reference magnitude of the electrical parameter is essentially obtained.

The high voltage electron tube may be a cold cathode electron tube. Such electron tubes may be able to withstand high currents and high voltages for a prolonged amount of time. They may also be switchable at a high frequency in high voltage applications.

In a fourth aspect of the present disclosure there is provided a power system comprising a control arrangement according to the third aspect of the present disclosure.

In one embodiment, the control arrangement may form a start-up device for connecting a load to the power system, and the control unit may be arranged to switch the high voltage electron tube such that the magnitude of the electrical parameter increases from being essentially zero to an operational magnitude level of the load.

The control arrangement may be arranged to detect a surge in the power system by determining a deviation in the magnitude of the electrical parameter from a predetermined range, wherein the control unit is arranged to switch the high voltage electron tube such that the surge is essentially removed from the power system.

One embodiment may comprise a capacitor, wherein the high voltage electron tube is arranged in parallel with the capacitor thereby providing a variable capacitive compensation in the power system.

The capacitor may be series connected with a load in the power system.

One embodiment may comprise a bypass arrangement for bypassing the control arrangement in case of a fault current in the power system occurs, which fault current has a magnitude above a predetermined threshold.

Thereby the variable compensation capacitor(s) or capacitor banks may be bypassed in case of a fault current having such a large magnitude that it would damage the control arrangement and/or the capacitor(s) if the capacitor(s) and control arrangement were not bypassed.

Additional features and advantages will be disclosed in the following.

BRIEF DESCRIPTION OF THE DRAWINGS

The invention and the advantages thereof will now be described by way of non-limiting examples, with reference to the accompanying drawings of which.

DETAILED DESCRIPTION OF THE INVENTION

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

Figure 1:
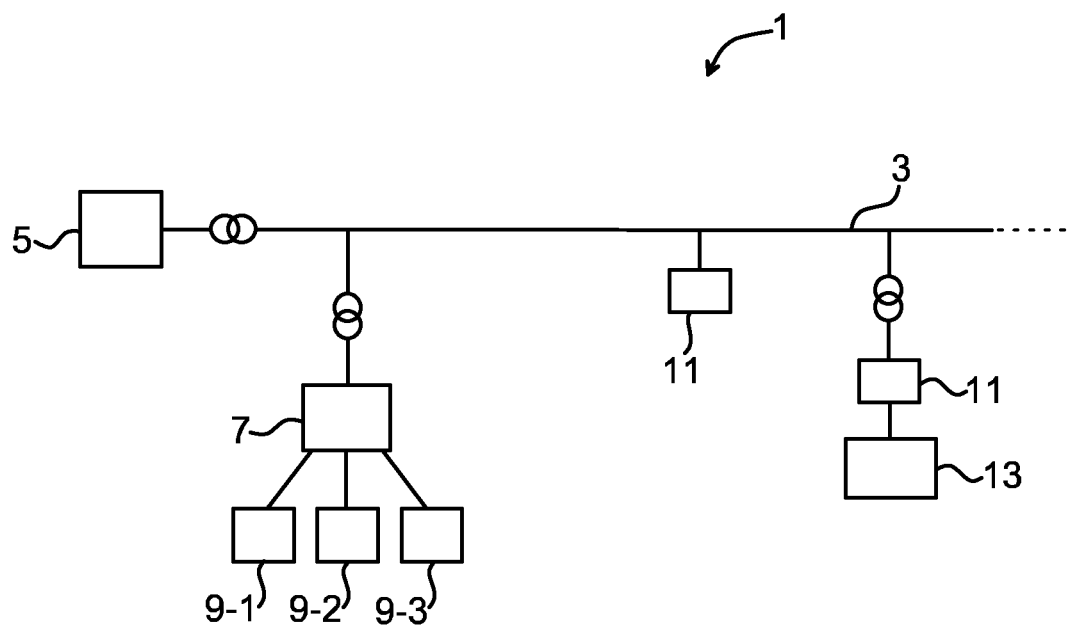
FIG. 1 is a schematic block diagram of a power system.

FIG. 1 shows a portion of a high voltage power system 1, for instance an electric grid. The power system 1 comprises a conductive line 3, such as a three phase power line, a power plant 5 in the form of a wind power plant, a substation 7, loads 9-1, 9-2 and 9-3 in a distribution network portion of the power system 1, a load 13 in the form of an industry such as a pulp and paper mill, and control arrangements 11.

The stability of the power system 1 may be affected by such factors as the variations in the loads 9-1, 9-2 and 9-3 over time, the variation in power which the power plant 5 is able to provide to the power system 1, and power system faults.

The present disclosure provides some examples of methods and a control arrangement for stabilization of a power system such as the exemplified power system 1. To this end, control arrangement 11 will now be described in more detail with reference to FIGS. 2-5.

Figure 2:
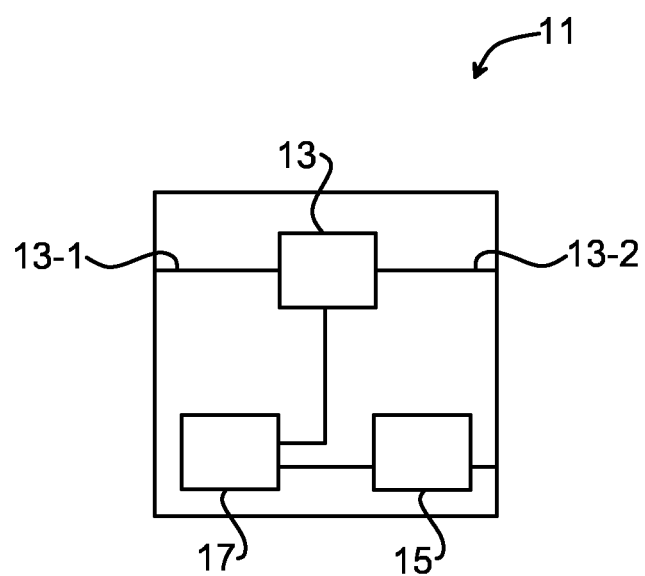
FIG. 2 is a schematic block diagram of a control arrangement in FIG. 1.

FIG. 2 is a block diagram of a control arrangement 11 for use in a power system such as power system 1. The control arrangement comprises one or more high voltage electron tubes 14 having first connection means 14-1 and second connection means 14-2 for connection to the conductive line 3 of the power system 1. In general, each electric phase of the power system 1 is connected to a respective high voltage electron tube 14.

High voltage electron tubes which may be suitable for the present disclosure are for instance cold cathode electron tubes such as the electron tube presented in U.S. Pat. No. 4,950,962.

In general, any electron tube which may withstand currents in a high voltage power system, and which may be switched in such a system, may be utilized.

The control arrangement 11 further comprises a measuring unit 15, such as a current transformer or a voltage transformer. The measuring unit 15 is connectable to the power system 1 for locally measuring a magnitude of an electrical parameter of the power system 1. Such an electrical parameter may for instance be a current or a voltage and the magnitude may for instance be the amplitude, e.g. the root mean square, of the current or voltage.

Figure 5:
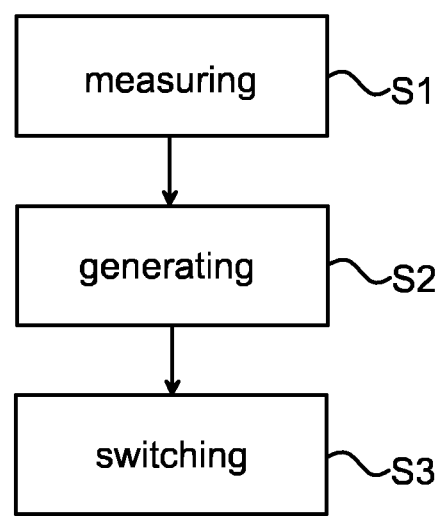
FIG. 5 is a flowchart of a method of controlling a magnitude of an electrical parameter in a power system by means of a high voltage electron tube.

In a first step S1 of the methods disclosed herein, the magnitude of the electrical parameter is measured, as shown in the flowchart in FIG. 5. The measuring may typically be repeated in order to be able to determine the magnitude of the electrical parameter at essentially any time instance. Thus any variation in the magnitude of the electrical parameter due to external factors, i.e. power system faults or the like will be detected by the control arrangement 11. Thereby the control or switching of the high voltage electron tube 14 may be adapted to instantaneous local changes of the electrical parameter in the power system 1.

The control arrangement 11 also comprises a control unit 17. The control unit 17 is connectable to the measuring unit 15. The control unit 17 is arranged to receive a measurement signal, either analog or digital, from the measuring unit 15. The measurement signal may contain data or information pertaining to the magnitude of the electrical parameter.

The control unit 17 has a processor for processing the measurement signal from the measuring unit 15. To this end the control unit 17 is arranged to, in a second step S2, generate a control signal.

In one embodiment the control signal is based on the measured magnitude of the electrical parameter and on a reference magnitude of the electrical parameter. The reference magnitude of the electrical parameter is typically a magnitude of the electrical parameter which is desired to be obtained in the power system 1. The reference signal may in some applications change dynamically, either due to a user command or the change may be initiated automatically based on a predefined set of reference values. In particular, in case the control arrangement is utilized as a start-up device, as will be described herebelow, the reference value may dynamically change from being essentially zero to a level which corresponds to the operational magnitude level of the load or generator which is being introduced into the power system.

The control signal may generally be in the form of a pulse wave. The pulse wave may have a duty cycle which may change in time for instance due to the utilization of pulse width modulation.

The control arrangement 11 may comprise a computer program for carrying out the methods disclosed herein. In one embodiment, the control unit comprises a computer program for carrying out the methods disclosed herein. In one embodiment, the processor comprises the computer program, e.g. the software, for carrying out the present methods.

The control unit 17 is arranged to control or switch the high voltage electron tube 14 of each electrical phase by means of the control signal, which is carried out in a step S3. The control signal may be provided to the grid (not shown), i.e. control electrode, of the high voltage electron tube. The high voltage electron tube 14, which is connected to the power system 1 when the control arrangement 11 is in operation, may thereby control the magnitude of the electrical parameter in the power system 1. The control signal may for instance be a control current or a control voltage.

Figure 3:
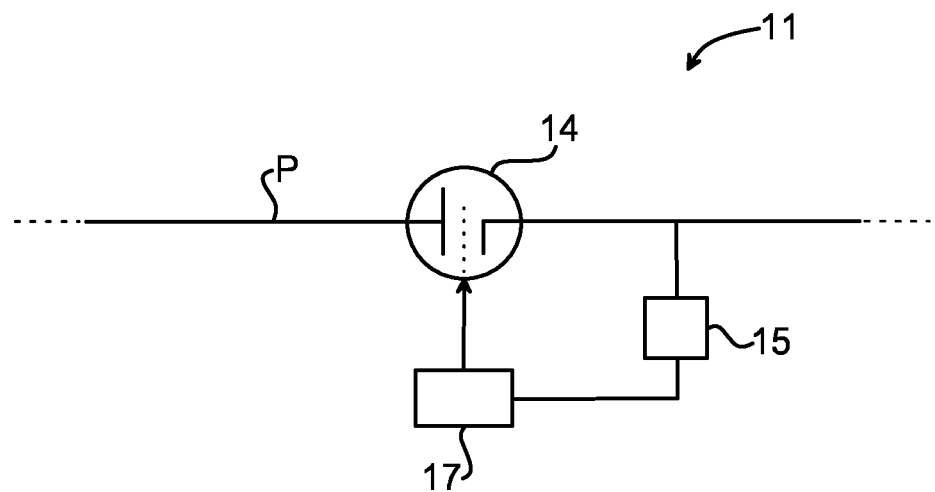
FIG. 3 shows a first example of a use of the control arrangement in FIG. 2.

FIG. 3 shows a schematic view of the control arrangement 11 when connected in a power system.

In a first example of use, the control arrangement 11 acts as a start-up device in a power system such as power system 1. For illustrative purposes, only one electric phase P is shown. The principle is however similar for each electric phase.

In the first example, the control arrangement 11 is connected in series with the loads of the power system 1. The measuring unit 15 is arranged to measure an electrical parameter of the phase P and provide a measurement signal to the control unit 17. The control unit 16 generates a control signal based on the measurement signal and the reference magnitude of the electrical parameter to thereby switch the high voltage electron tube 14.

The magnitude of the electrical parameter may be controlled by the switching pattern of the high voltage electron tube. The control signal provides switching of the high voltage electron tube 14 such that the electrical parameter, e.g. the current or voltage in phase P, increases gradually from being essentially zero to a magnitude corresponding to the operational magnitude level of the load or generator which is to be introduced into the power system. Such an increasing effect of the magnitude of the electrical parameter may for instance be obtained by providing a control signal in the form of a pulse wave having increasingly longer periods during which the high voltage electron tube 14 is in a conductive state.

The configuration according to the first example provides means for connecting e.g. loads, power generators or other electrical equipment to the power system 1. Thereby the magnitude of the electrical parameter to the electrical equipment may be increased gradually. As a result, the electrical equipment may be protected from a sudden electric impulse when connected to a high voltage electrical system.

For instance, the load 13 in FIG. 1, e.g. the pulp and paper mill, may be connected to the power system 1 via the control arrangement 11 thus being fed with a gradually increasing current.

Figure 4:
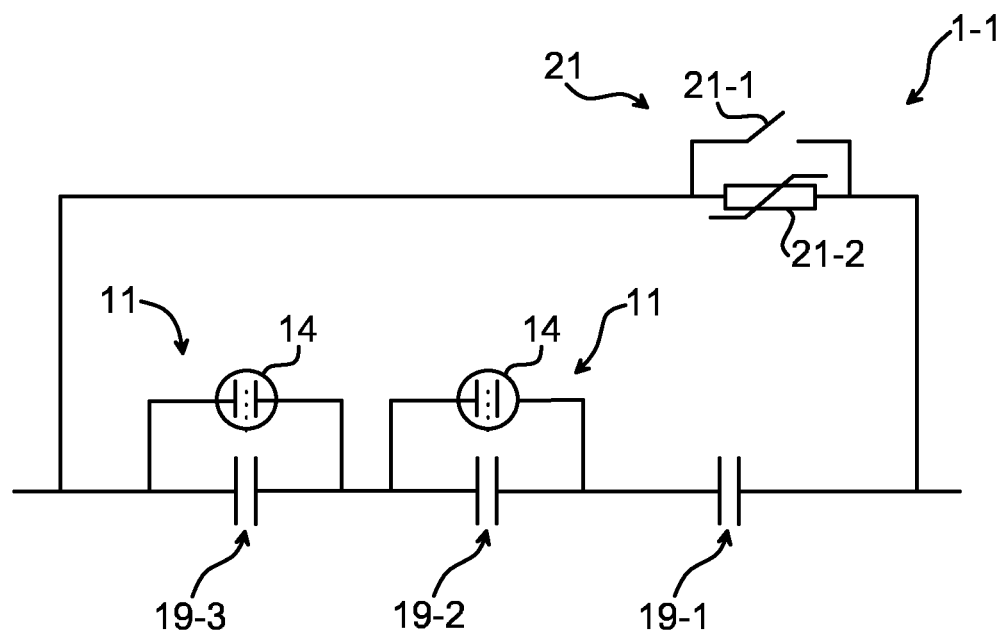
FIG. 4 shows a second example of a use of the control arrangement in FIG. 2.

FIG. 4 shows a second example of a use of the control arrangement 11. In particular, the control arrangement 11 in FIG. 4 may dampen power oscillations (PO) and reduce sub-synchronous resonance in a power system.

PO and SSC may occur in fix capacitive series compensated lines in a power system. PO and SSC are relevant issues for instance when integrating large wind farms or wind power plants from remote areas into a power system.

In order to assure power system stability, power oscillations should be dampened if they occur, and sub-synchronous oscillation should be reduced.

The circuit diagram in FIG. 4 shows a portion of a power system 1-1. The power system 1-1 comprises a first capacitor bank 19-1, a second capacitor bank 19-2, a third capacitor bank 19-3, and two control arrangements 11, each control arrangement 11 being parallel connected with a respective capacitor bank 19-2 and 19-3. For reasons of clarity, only the high voltage electron tubes 14 of the control arrangement 11 are shown in the figure, although it is to be understood that the control arrangement 11 of FIG. 4 is similar to the control arrangement 11 in e.g. FIG. 2.

The capacitor banks 19-1, 19-2, and 19-3 are connected in parallel with a bypass arrangement 21 comprising a bypass switch 21-1 and a varistor 21-2. The bypass arrangement 21 can provide fast bypass of currents exceeding a predetermined threshold for protecting the capacitors 19-1, 19-2, 19-2 and the control arrangement 11. One example of such a threshold may for instance be for currents having a magnitude above 30 kA. For currents having a magnitude below the predetermined threshold, the current flows through the capacitor banks 19-1, 19-2, 19-3 and/or the high voltage electron tubes 14, depending on the way they are being switched.

The control arrangements 11 are arranged to control, i.e. switch, the high voltage electron tubes 14 such that the amount of compensation provided by the second and third capacitor banks 19-2 and 19-3 may be controlled. Each capacitor bank of the second capacitor bank 19-2 and the third capacitor bank 19-3 may be individually controlled by their respective control arrangement 11. By providing controlled compensation by means of the control arrangements 11, PO or SSC may be dampened and reduced, respectively.

The second and the third capacitor banks 19-2 and 19-3 together with the control arrangements 11 form variable compensation capacitor units acting as high pass filters which damp or reduce power oscillations and sub-synchronous resonance in the power system 1-1.

In case of an internal power system fault, such as a short circuit or lightning strike, resulting in fault currents above a predetermined threshold, the bypass arrangement 21 protects the capacitor banks 19-1, 19-2, 19-3, as well as the control arrangements 11 by redirecting the current through the bypass switch 21-1.

The control arrangement of the present disclosure may be utilized in high voltage power systems such as the electrical grid, both in the transmission portion and the distribution portion thereof.

The skilled person in the art realizes that the present invention by no means is limited to the examples described hereabove. On the contrary, many modifications and variations are possible within the scope of the appended claims. For instance, the control arrangement may be used as a surge arrestor by switching the high voltage electron tube such that when a transient of the electrical parameter is detected by the measurement unit, the control signal switches off the high voltage electron tube.

What is claimed is:

1. A method of controlling a magnitude of an electrical parameter in a power system by means of a high voltage electron tube that is parallel connected to a capacitor, the method comprising:

measuring the magnitude of the electrical parameter, generating a control signal based on the magnitude of the electrical parameter and on a reference magnitude of the electrical parameter that changes dynamically, the control signal being a pulse wave, and switching the high voltage electron tube by means of the control signal such that the reference magnitude of the electrical parameter is essentially obtained and a variable capacitive compensation in the power system is provided.

2. A method of controlling a magnitude of an electrical parameter in a power system by means of a high voltage electron tube, the method comprising:

measuring the magnitude of the electrical parameter, generating a control signal based on the magnitude of the electrical parameter and on a reference magnitude of the electrical parameter that changes dynamically, the control signal being a pulse wave, and switching the high voltage electron tube by means of the control signal such that the reference magnitude of the electrical parameter is essentially obtained wherein said high voltage electron tube is arranged as a start-up device for connecting a load to the power system, wherein the switching of the high voltage electron tube comprises switching the high voltage electron tube such that the magnitude of the electrical parameter increases from being essentially zero to an operational magnitude level of the load.

3. The method as claimed in claim 1, comprising detecting a surge by determining a deviation in the magnitude of the electrical parameter from a predetermined range, wherein the step of switching involves switching the high voltage electron tube such that the surge is essentially removed from the power system.

4. A non-transitory computer program product comprising a computer program stored on a computer readable medium and executable on a computer, which computer program when executed on the computer performs a method of controlling a magnitude of an electrical parameter in a power system by means of a high voltage electron tube that is parallel connected to a capacitor, the method comprising:
measuring the magnitude of the electrical parameter,
generating a control signal based on the magnitude of the electrical parameter and on a reference magnitude of the electrical parameter that changes dynamically, the control signal being a pulse wave, and
switching the high voltage electron tube by means of the control signal such that the reference magnitude of the electrical parameter is essentially obtained and a variable capacitive compensation in the power system is provided.

5. A control arrangement for controlling a magnitude of an electrical parameter in a power system, which control arrangement comprises:
a high voltage electron tube having first connection means and second connection means for connection to the power system,
a control unit arranged to be connected to the high voltage electron tube, and
a measuring unit arranged to measure the magnitude of the electrical parameter in the power system, and to provide a measure of the magnitude of the electrical parameter to the control unit,
wherein the control unit is arranged to generate a control signal in the form of a pulse wave based on the magnitude of the electrical parameter and on a reference magnitude of the electrical parameter, which reference magnitude changes dynamically, and to switch the high voltage electron tube by means of the control signal such that the reference magnitude of the electrical parameter is essentially obtained,
wherein the control arrangement forms a start-up device for connecting a load to the power system, and the control unit is arranged to switch the high voltage electron tube such that the magnitude of the electrical parameter increases from being essentially zero to an operational magnitude level of the load.

6. The control arrangement as claimed in claim 5, wherein the high voltage electron tube is a cold cathode electron tube.

7. A power system comprising a control arrangement as claimed in claim 5.

8. The power system as claimed in claim 7, wherein the control arrangement is arranged to detect a surge in the power system by determining a deviation in the magnitude of the electrical parameter from a predetermined range, wherein the control unit is arranged to switch the high voltage electron tube such that the surge is essentially removed from the power system.

9. A control arrangement for controlling a magnitude of an electrical parameter in a power system, which control arrangement comprises:
a high voltage electron tube having first connection means and second connection means for connection to the power system,
a control unit arranged to be connected to the high voltage electron tube, and
a measuring unit arranged to measure the magnitude of the electrical parameter in the power system, and to provide a measure of the magnitude of the electrical parameter to the control unit,
wherein the control unit is arranged to generate a control signal in the form of a pulse wave based on the magnitude of the electrical parameter and on a reference magnitude of the electrical parameter, which reference magnitude changes dynamically, and to switch the high voltage electron tube by means of the control signal such that the reference magnitude of the electrical parameter is essentially obtained,
wherein the high voltage electron tube is arranged in parallel with the capacitor thereby providing a variable capacitive compensation in the power system.

10. The power system as claimed in claim 9, wherein the capacitor is series connected with a load in the power system.

11. The power system as claimed in claim 9, comprising a bypass arrangement for bypassing the control arrangement in case of a fault current in the power system occurs, which fault current has a magnitude above a predetermined threshold.

12. The power system as claimed in claim 1, wherein the capacitor is series connected with a load in the power system.

13. The power system as claimed in claim 1, comprising a bypass arrangement for bypassing the control arrangement in case of a fault current in the power system occurs, which fault current has a magnitude above a predetermined threshold.

* * * * *